(12) United States Patent
Helot et al.

(10) Patent No.: US 6,301,106 B1
(45) Date of Patent: *Oct. 9, 2001

(54) DOCKING STATION HAVING A PLURALITY OF ADAPTER TRAYS FOR A PLURALITY OF PORTABLE COMPUTERS

(75) Inventors: Jacques H. Helot, San Mateo; Jaime Segura, Palo Alto; Guy Lichtenwalter, San Jose, all of CA (US); Michael D. Derocher; Gerald W. Steiger, both of Corvallis, OR (US); Masahiko Muranami, San Jose, CA (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/179,241

(22) Filed: Oct. 26, 1998

(51) Int. Cl.[7] .................................................. G06F 1/16
(52) U.S. Cl. ..................... 361/686; 361/681; 361/683; 320/107; 320/110; 320/113
(58) Field of Search .................................. 361/686, 681, 361/683; 320/107, 113, 110

(56) References Cited

U.S. PATENT DOCUMENTS 5,694,292 * 12/1997 Paulsel et al. ...................... 361/686
5,699,226 * 12/1997 Cavello .............................. 361/686

* cited by examiner

Primary Examiner—Leo P. Picard
Assistant Examiner—Yean-Hsi Chang

(57) ABSTRACT

The invention provides a single docking station structure which is usable for a set of different pieces of equipment having essentially similar interfaces, such as a manufacturer's line of portable ("notebook" or "laptop") computer product models. A common first module supports interfaces with peripheral devices or the like. A model-specific second module, second from a set of second modules that correspond with various models from the line of portable computers, is coupled with the first module to support the portable computer. The second module supports the portable computer, so as to interface it directly with the interface on the first module. The second modules, preferably configured as trays for holding the portable computers, are very simple and inexpensive to manufacture. The trays can be stored next to the docking station (like magazines on a bookshelf). An identification system, which labels the different trays and cross-references them to the corresponding portable computers, allows for future changes in the manufacturer's product line, in which a new model of portable computer requires either a new tray or one of the previously existing trays. The invention is advantageous to manufacturers because it reduces the number and variety of docking station products required for use with the manufacturer's portable computers.

11 Claims, 8 Drawing Sheets

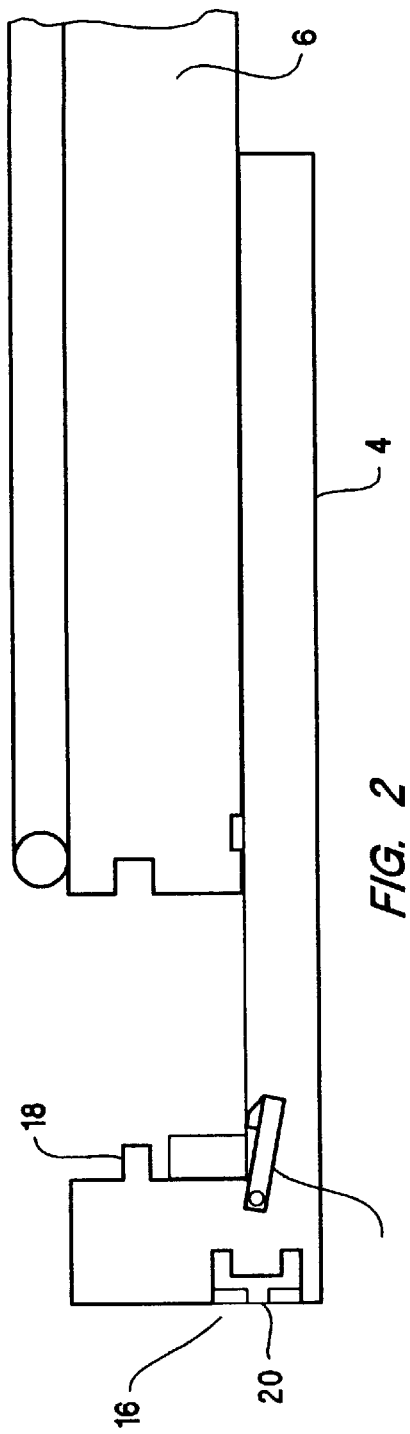
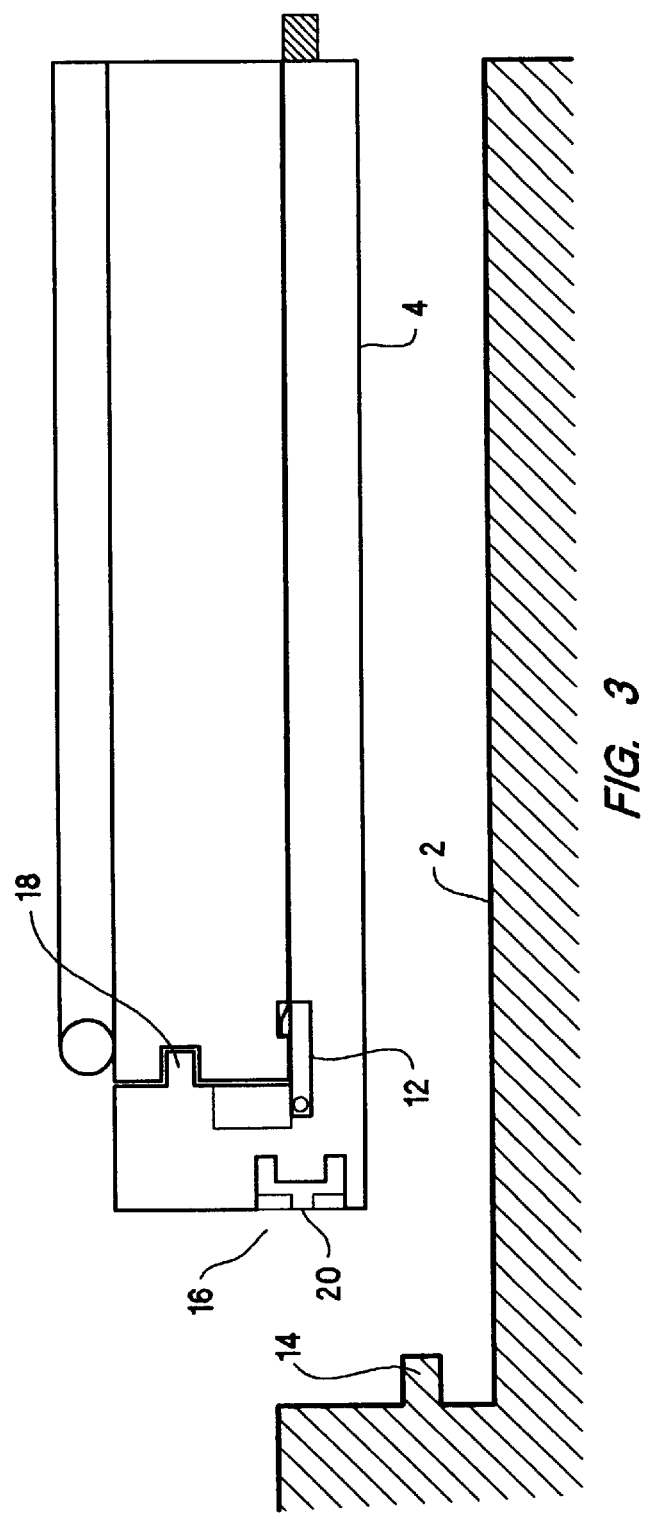

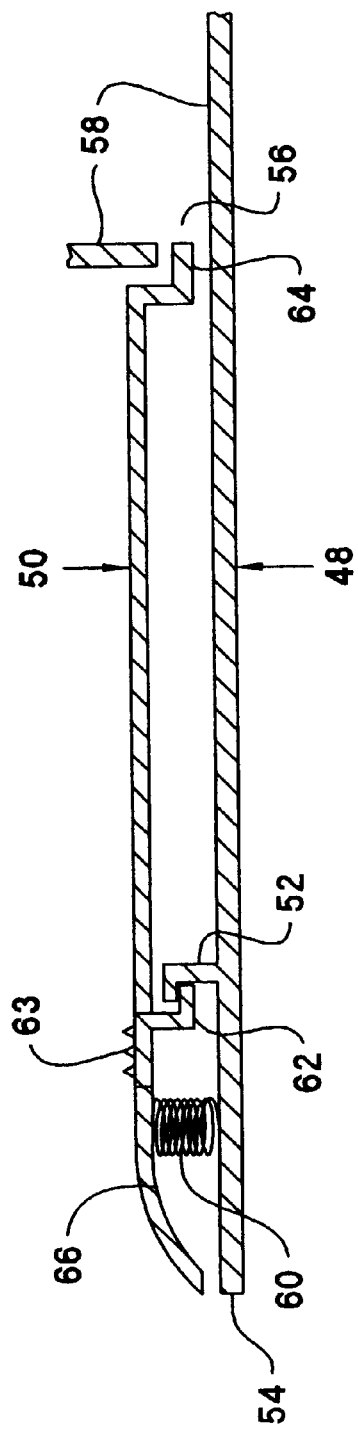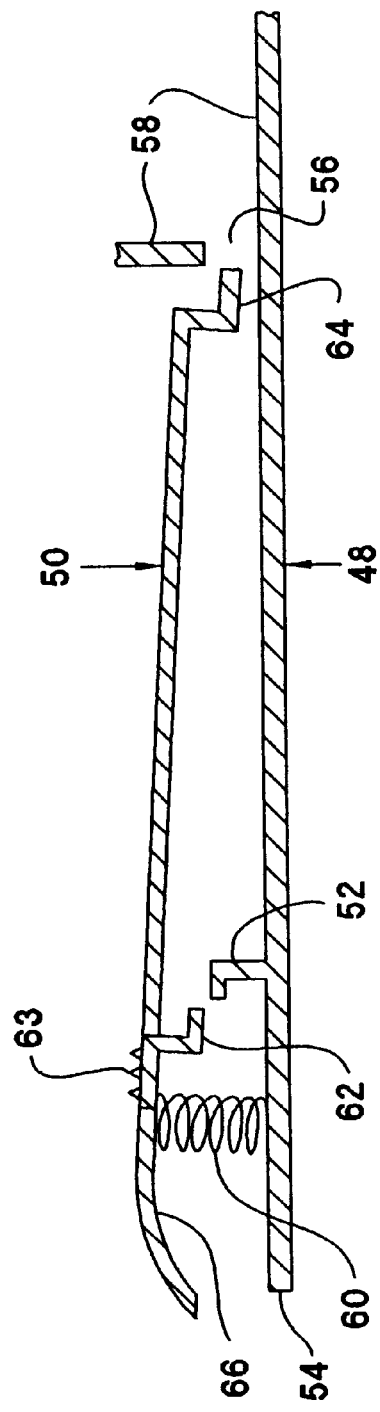
FIG. 10
FIG. 9

DOCKING STATION HAVING A PLURALITY OF ADAPTER TRAYS FOR A PLURALITY OF PORTABLE COMPUTERS

FIELD OF THE INVENTION

The invention generally relates to the field of personal computers. More specifically, the invention relates to docking station and peripheral technology for facilitating use of portable computers as "desktop replacements."

BACKGROUND OF THE INVENTION

Portable computers, colloquially referred to as "laptop" or "notebook" computers, have increased in power, speed, and memory capacity to the point where they offer functionality comparable to that of desktop-style personal computers. However, because portable computers have been designed for small size and low weight, their keyboards and displays have been limited in size, making the portable computers less convenient to use.

Accordingly, their features and accessories have been designed with suitable interfaces to allow a user to use the same large-size displays and full-size keyboards as would normally be used with a desktop machine. In particular, docking stations have been developed, to hold all of the electrical connections between the keyboard, display, network connection, etc., with the computer. Thus, all a user has to do is "dock" the portable computer with the docking station, and the computer is ready to directly interface with all of the peripherals. It will be understood that there must be physical compatibility between the portable computer and its docking station.

There is a drawback, however, that portable computers, even within a given manufacturer's line, vary considerably in size, configuration, etc. Thus, conventionally it has been necessary for a portable computer manufacturer to have a whole line of docking stations, commensurate with its line of portable computers. Accordingly, manufacturers have had to maintain lines of functionally identical but physically different docking station models. Also, when a manufacturer develops a new line of portable computers, it must also develop a new line of docking stations.

There is an additional issue related to user convenience. To disengage the unit or swap units, the user must decouple the connectors. This involves both the user's time, and the effort the user must employ to disengage the connectors by overcoming their insertion force.

Therefore, there remains a need for a docking system which fully solves the problems of interchangeability and manufacturability discussed above, and which also provides user convenience.

SUMMARY OF THE INVENTION

To overcome the drawback described above, the invention provides a standardized docking station module (a "first" module), embodying most of the peripheral interfaces, etc., required for coupling the docking station to the peripheral devices. The invention also provides a set of portable-computer-model-specific adapter modules ("second" modules), preferably configured as "trays," which accommodate respective portable computer models within the manufacturer's product line.

A user will have a particular model of computer, the corresponding adapter module, and the standard docking station. The user installs the adapter module into the docking station, and couples the docking station to the peripherals. From then on, the module accommodates the computer's unique configuration when the user docks the computer.

As a result, the invention advantageously allows the manufacturer to minimize the cost and design complexity of its docking accessories. For a given new model of computer, all the manufacturer has to do is provide a new second module for use with the same standard docking station. All features which change with the computer model are resident within the second module. This will generally just be features relating to the physical dimensions of the computer. All features which stay the same from one computer to the next, such as standard peripheral interfaces, reside on the first module. Thus, manufacturing costs and design manpower are conserved.

Also, when the user obtains a new computer, he/she can still use the existing peripherals and the docking module coupled to them. The user need only obtain a new docking module specific to that new computer.

BRIEF DESCRIPTION OF THE DRAWINGS

FIGS. 2 and 3 are cutaway side views showing the operation of the apparatus of FIG. 1.

FIGS. 9 and 10 are simplified side views showing a coupling/decoupling structure for the first and second docking modules of the invention, in the coupled and uncoupled states, respectively.

DETAILED DESCRIPTION OF THE PREFERRED EMBODIMENTS

There are three problems to be solved:
1. how to make it possible to dock different kinds of notebooks (different height and width, different connector locations) in one docking station.
2. how to easily and comfortably insert and remove adapter trays (trays that adapt the docking station to different portables) from a docking station, keeping the mechanism and trays as simple as possible.
3. how to identify which tray has to be used for which portable, knowing that product names will change with time.

A Prior Art Docking Tray

Figure 1:
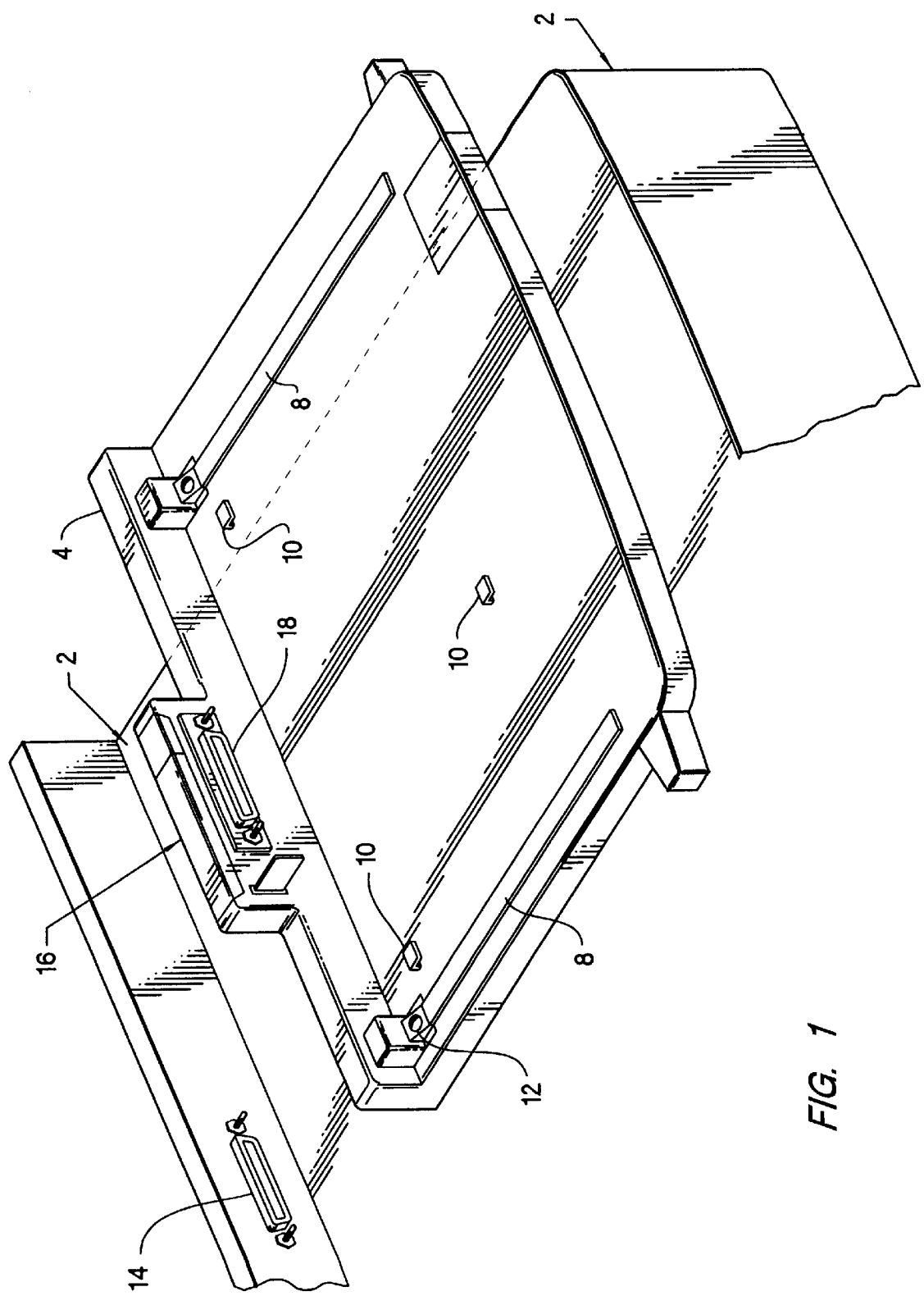
FIG. 1 is a perspective view of a prior art apparatus.

A conventional docking station apparatus is shown in FIGS. 1, 2, and 3. The apparatus includes a first module 2 and a second module 4. The second module 4 is configured generally as a tray, for holding a notebook computer 6 (FIG. 2). The second module 4 includes rails 8 for aligning the notebook 6, and locking features including tabs 10 and a retractable pin 12, for securing the notebook 6 in place.

The first module 2 includes an interface connector 14, to allow coupling to peripheral devices (not shown) such as a monitor or a keyboard. An interface structure 16 is provided on the second module, through which the docked notebook computer 6 interfaces with the connector 14 and the peripheral devices. The interface structure 16 of the second module 4 includes a connector 18 for coupling to the notebook 6, a connector 20 for coupling with the connector 14 of the first module 2, and electrical connections for coupling the connectors 18 and 20. For simplicity, the electrical connections are not shown, but it will be understood that they include pin-to-pin wiring for signals of equivalent interfaces, and/or rewiring for compatibility between connectors of two different standard interfaces.

It will thus be understood that the second module 4 is a mechanically complex unit. Manufacture of the unit disadvantageously requires assembly of both physical and electrical parts. Also, the complexity of the unit places burdens on the user, for set-up and use.

The Invention

A docking apparatus according to the invention reduces the mechanical and electrical complexity of the conventional apparatus. In accordance with the invention, the second module is configured to hold the docked notebook computer at a correct vertical and lateral placement such that the connector of the notebook is aligned for direct coupling with the connector on the first module.

The invention provides the advantage that different notebook computers can all use the standard first module, and further that the second module need only be a mechanically simple structure, such as a molded piece of plastic. Accordingly, manufacturing costs for the second module are saved, and the user has a less complex structure to deal with.

Figure 4:
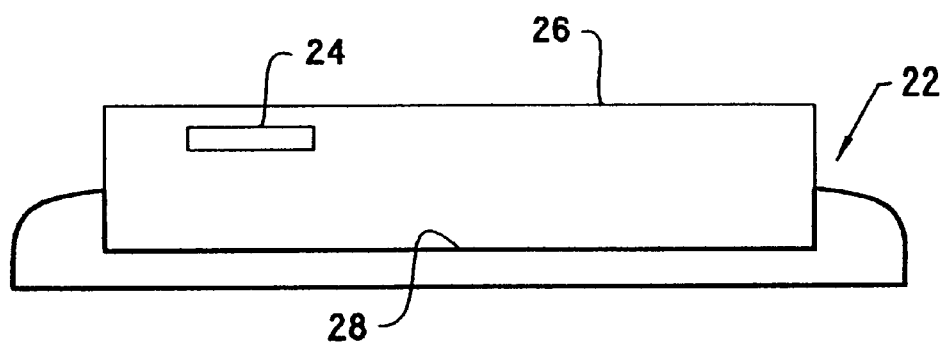
FIGS. 4, 5, and 6 are front-end views of a docking apparatus according to the invention.
Figure 5:
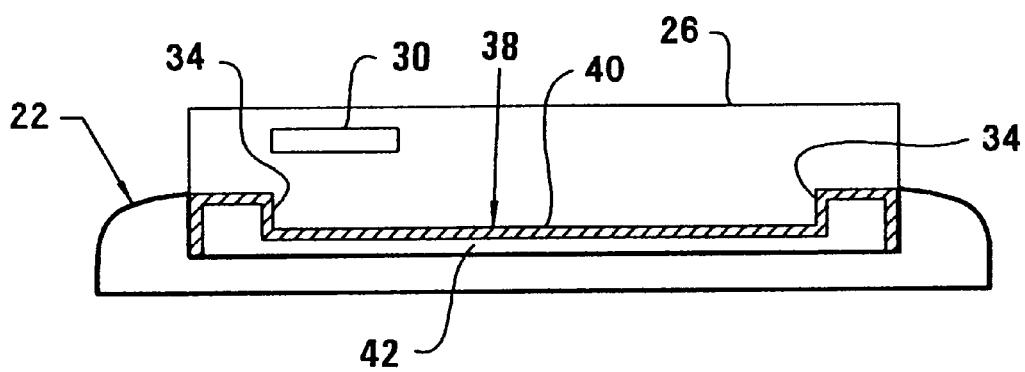
Figure 6:
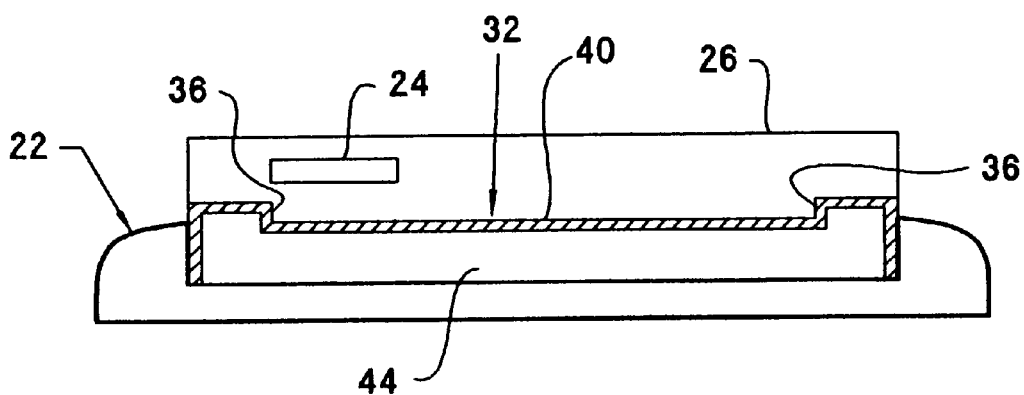
Figure 7:
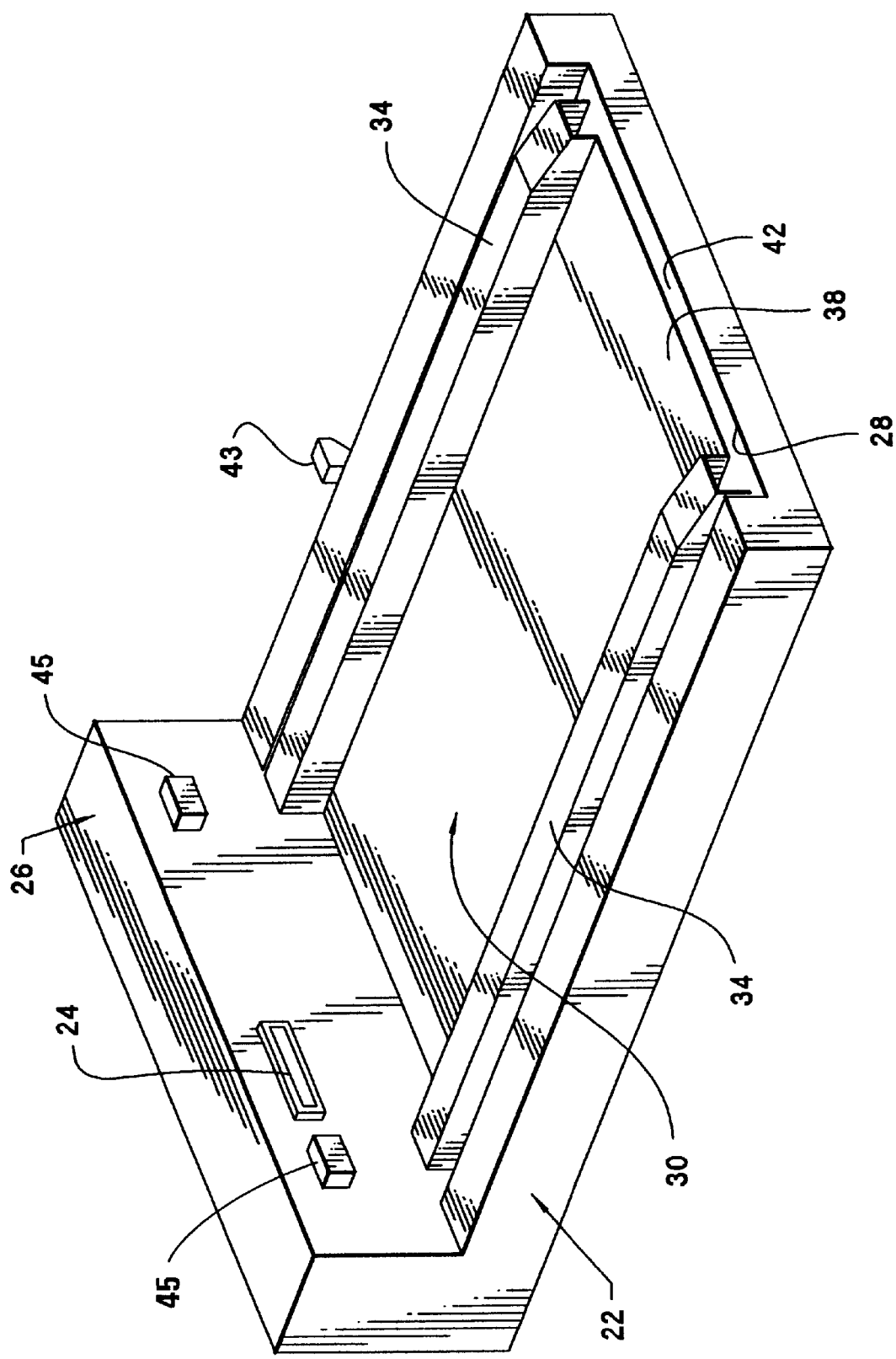
FIG. 7 is a perspective view of the embodiment of FIGS. 4–6.

FIGS. 4, 5, and 6 are simplified schematic front-end views of a docking apparatus according to the invention. FIG. 7 is a perspective view showing, for added comprehension, a docking apparatus generally as given in FIGS. 5 and 6.

FIG. 4 shows a first docking module 22, having a physical configuration generally similar to the first module 2 of FIGS. 1–3, in that the first module 22 is configured to accept a generally tray-like second module, which will bear the notebook computer. A connector 24, for coupling the notebook to peripheral devices, is positioned on an interface structure 26, which extends upward from a surface 28. The surface 28, in this front-end view, extends out from the drawing, and forms a bed for receiving the second module.

In FIGS. 5, 6, and 7, a second docking module is added to the first module of FIG. 4. FIGS. 5 and 6 show cross-sections of two different second docking modules, 30 and 32 respectively. FIG. 7 shows one of the second docking modules, cross-hatched for easy visibility. The docking modules 30 and 32 are configured to hold their respective notebook computers in predetermined positions. Any suitable structure, such as rails 34 and 36, may be used for positioning the notebooks laterally. Other suitable structures, such as surfaces 38 and 40, hold the notebooks at predetermined heights.

Each of the second docking modules 30 and 32 are customized for respective different notebook computers. In accordance with the invention, the second docking modules have dimensions which take into account the different dimensions of the respective notebooks. By doing so, the second modules position the different notebooks so that, whichever notebook is used, the notebook's peripheral interface lines up with the interface connector 24.

Consider, for instance, two different notebook computer models whose interface connectors are at different elevations above the bottom surface of the notebooks. In accordance with the invention, the second modules lift the notebooks up to two different heights, so that in both cases their connectors line up with the connector 24.

For instance, compare the trays 30 and 32 shown in FIGS. 4 and 5. The surface 38 of the tray 30 is shown as being lower than the surface 40 of the tray 32. If the tray 30 holds a bigger notebook, with a connecter higher above its bottom surface, then the notebook's connector will be the same height as the connector of a thinner notebook held by the tray 32.

Similarly, differences in the lateral position of connectors on different notebooks can be compensated for by designing different trays with the rails (e.g., the rails 34 and 36, suitably displaced to the left or right.

The trays of FIGS. 5 and 6 are shown as having gaps 42 and 44 beneath them, between them and the surface 28 of the first module 22. In other embodiments, the trays could be thicker, so the space is taken up by tray material.

Preferably, an undocking apparatus is provided on the first module, since the undocking process is not tray-specific. Undocking a computer from the docking apparatus of FIG. 7 is done by urging the computer forward, along the rails 34. Responsive to user manipulation of a release lever 43, one or more ejectors 45 push against the computer, to disengage the computer from the connector 24.

What the Trays are Made of

In a preferred embodiment, the trays are made of molded plastic material, for easy and inexpensive manufacturing. However, any suitable material such as epoxy may be molded for use. Also, the trays can be made of stamped sheet material such as sheet metal, suitably contoured to position the notebooks appropriately.

It is a noteworthy feature of the invention that the trays are simple to manufacture out of a single material, and do not require assembly.

Another noteworthy feature is that, in many preferred embodiments, the second modules are flat enough for easy storage in a set. They may be stored in a stack on a flat surface, or on a rack, just as magazines would be stored. This gives the user easy access to a selection of trays, to pick out the one the user needs.

Tray Legends

In a further preferred embodiment, the different trays have tray legends, such as large letters of the alphabet ("A", "B", "C", etc.), which are easily visible and allow users to tell easily which tray is to be used with which notebook computer. The legends may conveniently be positioned on the undersides of the trays, or at other suitable locations thereon.

The legends may be formed on the tray material itself. This is a preferred embodiment, for trays made of molded plastic or the like. Alternatively, the legends may be applied to the trays as labels, appliques, etc.

The trays preferably also bear a cross-referencing legend, such as a matrix, that explains which tray goes with which portable computer. Thus, even if a user picks up the wrong tray first, he/she can read the matrix to identify which tray he/she needs, and then simply look at the tray legends, quickly to find the right one.

The tray legends may include model numbers, or the like, for identifying which tray is to be used with which notebook. However, it is contemplated that the trays may be useful with successive generations of notebook computers, whose model numbers will not be known at the time the trays are made. For instance, in an initial product offering, tray "A" goes with model 1000, tray "B" goes with model 2000, and tray "C" goes with model 3000. Then, later on, model 4000, which also goes with tray "B", is released. The "A", "B", and "C" tray legends need not change, but there is a need for updating the cross-referencing legend to indicate that model 4000 also uses tray "B".

To allow updating for future notebook models, the cross-referencing legend is preferably provided on an attachable and removable label, such as an adhesive label. When a docking station is sold new, a label showing the cross-referencing for the current line of notebook computer products is provided. Later, when a new tray for a newly developed notebook is sold, a new label comes with it. Alternatively, when a new notebook, compatible with an existing tray, is sold, a new label is provided with the new notebook. Since labels are inexpensive and easy to print up, it may be administratively easy and cost effective to provide a new label with each new notebook. A purchaser who does not have or use a docking station can simply discard the label.

The labels can also have blank space, to allow the users to update the label themselves by writing new information (trays, corresponding product names or model numbers) in the blank space.

Figure 8:
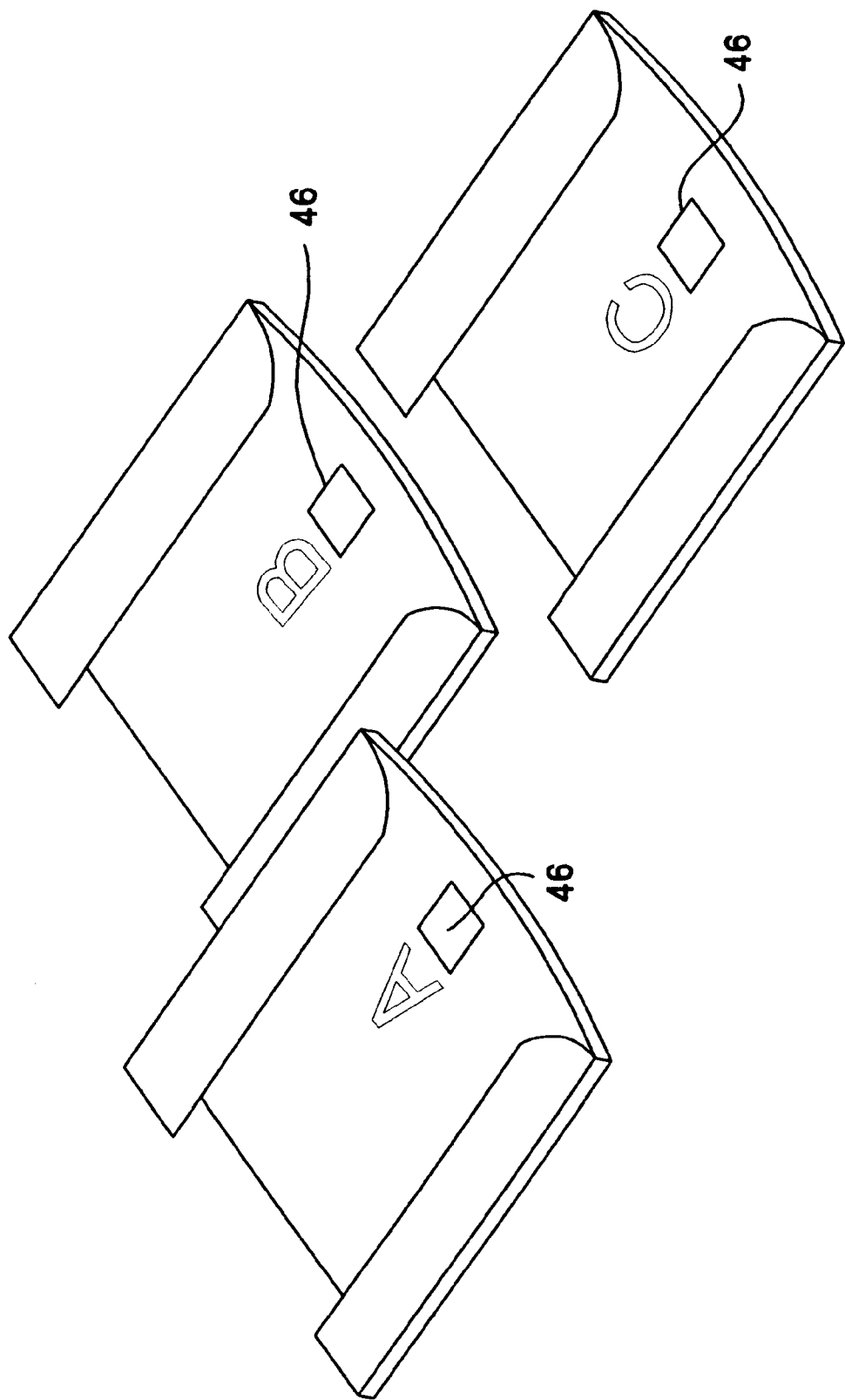
FIG. 8 is a perspective view of several second docking modules, showing legends.

FIG. 8 is a simplified perspective view of three trays. A user having a docking station for use with several different notebooks might have just such a collection of trays on hand for the various users to select from. Tray legends are shown as large, easily visible block letters "A", "B", and "C". Also, cross-referencing legends are shown as labels 46. Because the legend information is provided conspicuously, for easy finding and reading, a user can easily select the desired tray and couple it to the first docking module for convenient docking and use of the user's notebook.

Installation, Latching

FIGS. 9 and 10 are side views of first and second docking modules, showing one embodiment of a coupling/decoupling arrangement for first and second modules according to the invention.

In general, the second module should be easy to place in position, and to couple and decouple, with simple, intuitive user hand movements and manipulations. Preferably, the coupling/decoupling should be mechanically simple, so that the second modules will be simple and inexpensive to manufacture.

In the embodiment of FIGS. 9 and 10, a first docking module 48 and a second docking module 50, again preferably configured as a tray, are shown. The first docking module 48 includes an engaging structure, here shown as a tab 52 near a front end 54 thereof, and an aperture 56 near a back end 58 thereof. The coupling/decoupling structure further includes a biasing structure, here shown as a spring 60.

The second docking module 50 also includes an engaging structure, here shown as a hook 62 mounted on a switch 63, and a tab 64. The switch 63 slides forward and backward (that is, to the right and to the left, respectively, in the side view of FIGS. 9 and 10). The second docking module 50 further includes a biasing structure, here shown as a surface 66.

Let us first consider FIG. 9. When the decoupled tray 50 is placed into position, in preparation for coupling with the first module 48, the surface 66 engages the spring 60. Spring tension from the spring 60 urges the tray 50 away from the first module 48, in a generally upward direction.

The user couples the tray 50 to the first module 48 by engaging the engaging structures. In this case, the user first inserts the tab 64 into the aperture 56, and then depresses the tray 50, overcoming the upward bias force from the spring 60. Then, the user pushes the switch 63 away from him/her. This causes the hook 62 to engage with the tab 52. After the user releases the tray 50, the spring 60 urges the hook 62 against the tab 52, and the tab 64 against the aperture 56, thereby holding the tray 50 in place. This is shown in FIG. 10.

Decoupling works conversely. When the user pushes the switch 63 to draw it back toward him/her, the hook 62 disengages from the tab 52. The spring 60 pushes the tray 50 upward, releasing the tray 50.

FIGS. 11, 12

There are numerous ways of configuring the type of mechanism just described. In particular, if the latching switch 63 is placed on the first module, further manufacturing costs on the second module are saved. Such a switch may be accessed by the user through an aperture in the second module. This embodiment advantageously keeps the second module a single piece, which can be made from molded plastic or the like, and requires no assembly.

Figure 11:
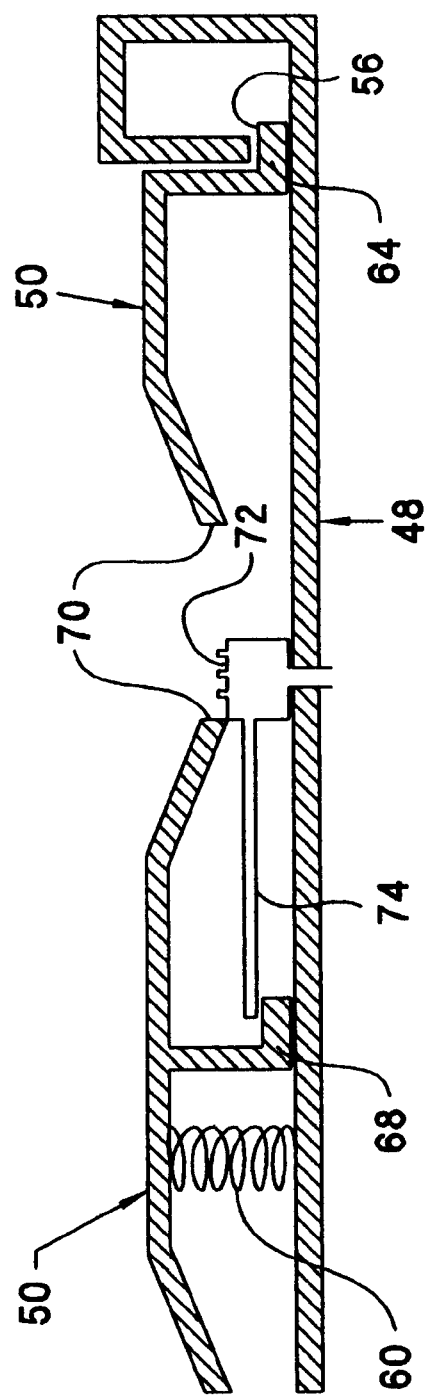
FIGS. 11 and 12 are simplified side views showing a preferred coupling/decoupling structure for the first and second docking modules of the invention, in the coupled and uncoupled states, respectively.
Figure 12:
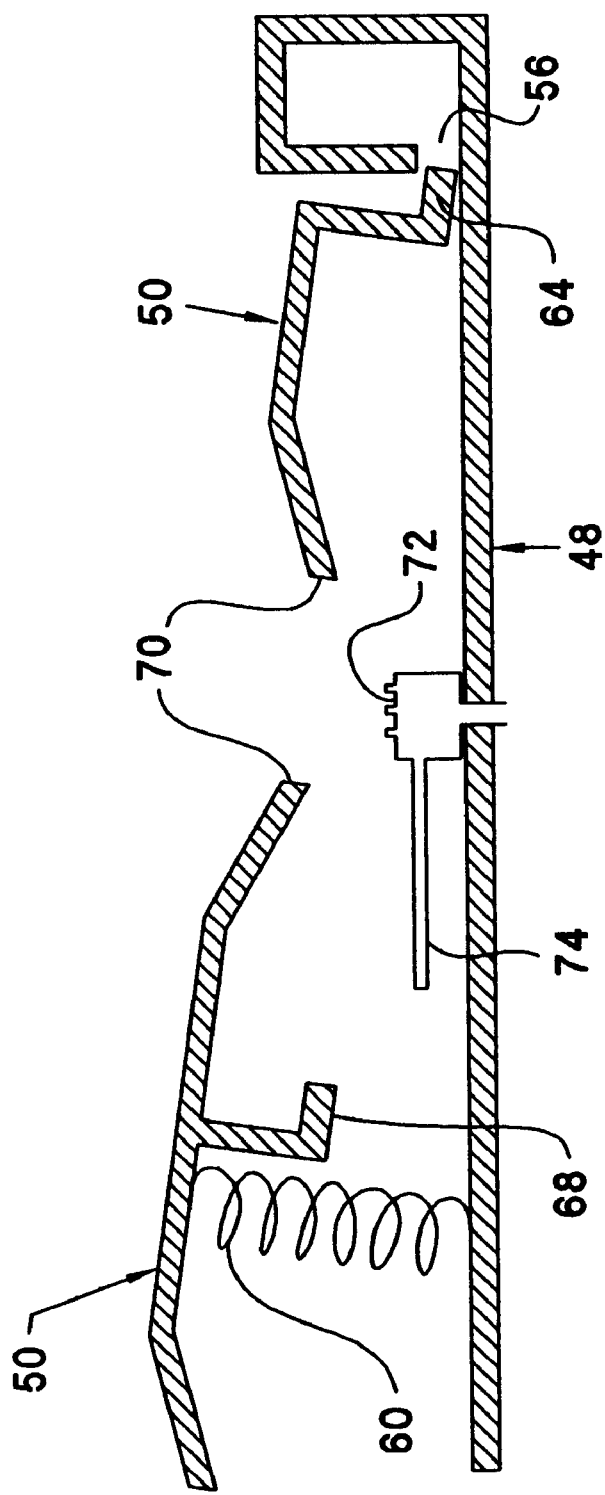

For instance, in FIGS. 11 and 12, there are shown coupled and decoupled views, respectively, of such an embodiment. FIGS. 11 and 12 are cross-sectional side views, so that an aperture 70 in the tray 50 is shown as a gap.

Elements numbered similarly to those of FIGS. 9 and 10 are equivalent.

In this embodiment, however, a hook 68 is formed on the side of the second module 50 facing the first module. The aperture 70 in the second module 50 gives the user finger access to a slider switch 72, which is movably disposed on the first module 48 for a reciprocating, back-and-forth range of motion.

The switch 72 bears a tab 74 which engages the hook 68 to hold the tray 50 in place (FIG. 11), or disengages from the hook 68 to release the tray 50 (FIG. 12). Accordingly, the apparatus of FIGS. 11 and 12 functions in much the same way as that of FIGS. 9 and 10. However, the tray 50 is now simpler in structure, and provides easy, inexpensive manufacturability.

Alternative Embodiments of the Invention

Persons skilled in the art will be able to conceive numerous other docking module structures that offer the same advantages as that disclosed above, based on the ideas and concepts given in this disclosure, and on the particular embodiments described. Such other structures will fall within the spirit and scope of the invention as recited in the appended claims.

For instance, while the embodiment of FIGS. 9 and 10 couple end decouple the second docking module vertically, it would also be possible to slide a tray-type second docking module in horizontally (that is, from left to right in the side view of FIGS. 9 and 10). The first docking module may include a mechanical structure comparable to that of a front-end-loading videocassette recorder, an automobile cassette tape player, etc. In such a structure, when the second docking module is pushed forward against a bias, it pops perpendicularly (e.g., downward) into engagement. The user presses a release button to push the second docking module out of engagement, and then the bias pops the second docking module back out.

What is claimed is:

1. A docking station for a first portable computer and a second portable computer, comprising:

a connector;

a surface configured to accept a first adapter tray, the first adapter tray further comprising a first tray legend providing an indication that the first adapter tray should be used with the first portable computer;

the surface also configured to accept a second adapter tray, the second adapter tray further comprising a second tray legend providing an indication that the second adapter tray should be used with the second portable computer; and the surface further configured to employ a spring that automatically pushes upward on at least one of the first and the second of said adapter trays when the at least one of the first and second adapter trays is removed from the surface.

2. The docking station of claim 1, wherein the first tray legend is easily visible.

3. The docking station of claim 2, wherein the first tray legend is a large letter of the alphabet.

4. The docking station of claim 1, wherein the first tray legend is molded into the first adapter tray.

5. The docking station of claim 1, wherein the first tray legend is a label applied to the first adapter tray.

6. The docking station of claim 1, wherein the first tray legend is an applique applied to the first adapter tray.

7. The docking station of claim 1, wherein the first adapter tray further comprises a first cross referencing legend, the first cross referencing legend cross referencing the first adapter tray with an identification of the first portable computer.

8. The docking station of claim 7, wherein the first cross referencing legend contains a model number corresponding to the first portable computer.

9. The docking station of claim 8, wherein the first cross referencing legend also contains a model number corresponding to a third portable computer.

10. A method of updating a docking station having an adapter tray, comprising the steps of:

shipping a first adapter tray label with the adapter tray, wherein the first adapter tray label indicates that a first portable computer is compatible with the adapter tray;

announcing a second portable computer; and shipping a second adapter tray label with the second portable computer, wherein the second adapter tray label indicates that the second adapter tray is compatible with the first and second portable computers.

11. A method of updating a docking station having a first adapter tray, comprising the steps of:

shipping a first adapter tray label with the first adapter tray, wherein the first adapter tray label indicates that a first portable computer is compatible with the first adapter tray;

announcing a second portable computer; and shipping a second adapter tray label with a second adapter tray, wherein the second adapter tray label indicates that the second portable computer is compatible with the second adapter tray.

* * * * *

UNITED STATES PATENT AND TRADEMARK OFFICE
CERTIFICATE OF CORRECTION

PATENT NO. : 6,301,106 B1
DATED : October 9, 2001
INVENTOR(S) : Jacques H. Helot et al.

It is certified that error appears in the above-identified patent and that said Letters Patent is hereby corrected as shown below:

Column 8,
Lines 1-11, Claim 10 should be deleted
Lines 12-23, Claim 11 should be deleted Signed and Sealed this Fifth Day of October, 2004

JON W. DUDAS
*Director of the United States Patent and Trademark Office*